(12) United States Patent
Yin

(10) Patent No.: US 11,178,452 B2
(45) Date of Patent: *Nov. 16, 2021

(54) PLAYING METHOD, DEVICE AND STORAGE MEDIUM OF WEBPAGE-BASED MEDIA FILE

(71) Applicant: Beijing Bytedance Network Technology Co., Ltd., Beijing (CN)

(72) Inventor: Guohui Yin, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/021,875

(22) Filed: Sep. 15, 2020

(65) Prior Publication Data

US 2020/0413130 A1 Dec. 31, 2020

Related U.S. Application Data

(63) Continuation of application No. PCT/CN2018/103575, filed on Aug. 31, 2018.

(30) Foreign Application Priority Data

May 29, 2018 (CN) .......................... 201810530816.3

(51) Int. Cl.
*H04N 21/4402* (2011.01)
*H04N 21/858* (2011.01)
(Continued)

(52) U.S. Cl.
CPC ..... *H04N 21/4402* (2013.01); *H04N 21/8456* (2013.01); *H04N 21/858* (2013.01); *H04N 21/85406* (2013.01)

(58) Field of Classification Search
CPC ............. H04N 21/4402; H04N 21/858; H04N 21/85406; H04N 21/2343; H04N 21/8456
See application file for complete search history.

(56) References Cited

U.S. PATENT DOCUMENTS

| 2003/0061369 A1 | 3/2003 | Aksu et al. | |
| 2009/0208119 A1* | 8/2009 | Lee | ........................ H04N 19/61 382/232 |

(Continued)

FOREIGN PATENT DOCUMENTS

| CN | 104363511 A | 2/2015 |
| CN | 106961613 A | 7/2017 |

(Continued)

OTHER PUBLICATIONS

International Patent Application No. PCT/CN2018/103575; Int'l Search Report; dated Feb. 22, 2019; 2 pages.

(Continued)

*Primary Examiner* — Benjamin R Bruckart
*Assistant Examiner* — Akshay Doshi
(74) *Attorney, Agent, or Firm* — BakerHostetler

(57) ABSTRACT

A playing method of a webpage-based media file is provided, including analyzing moov encapsulated in an moov box of a media file to obtain media information configured for describing media data encapsulated in an mdat box of the media file by a player built-in a webpage, according to time and a position of the media data represented by the media information, obtaining a section of media data in the mdat box of the media file; encapsulating the obtained section of media data and moov describing the section of media data according to a box structure of a fragmented media file to obtain a corresponding fragmented media file; and sending the fragmented media file to a media element of the webpage by a media source extension interface of the webpage for (Continued)

decoding and playing; the media file adopts a non-streaming media format.

18 Claims, 8 Drawing Sheets

(51) Int. Cl.
*H04N 21/854* (2011.01)
*H04N 21/845* (2011.01)

(56) References Cited

U.S. PATENT DOCUMENTS

| | | | |
|---|---|---|---|
| 2012/0143986 A1* | 6/2012 | Robinson | H04L 67/02 |
| | | | 709/217 |
| 2012/0265853 A1* | 10/2012 | Knox | H04N 21/2187 |
| | | | 709/218 |
| 2014/0139735 A1* | 5/2014 | Liu | H04N 7/0117 |
| | | | 348/441 |
| 2015/0304730 A1* | 10/2015 | Yamagishi | H04N 21/85406 |
| | | | 725/137 |
| 2016/0021404 A1 | 1/2016 | Lin et al. | |

FOREIGN PATENT DOCUMENTS

| | | |
|---|---|---|
| CN | 107613029 A | 1/2018 |
| JP | 2005-504480 A | 2/2005 |
| JP | 2005-086362 A | 3/2005 |
| JP | 2008-199387 A | 8/2008 |
| WO | WO 2017/140939 A1 | 8/2017 |

OTHER PUBLICATIONS

Japan Patent Application No. 2020-552075; Notice of Reasons for Refusal; dated Aug. 23, 2021; 4 pages.
HTML5 & CSS3 Quick Reference, Cite No. 11, Cited in JP app No. 2020-552075 dated Aug. 23, 2021, see p. 3—cite No. 14.
HTML5 WebStandard API, Cite No. 13, Cited in JP app No. 2020-552075 dated Aug. 23, 2021, see p. 3—cite No. 14.

* cited by examiner

PLAYING METHOD, DEVICE AND STORAGE MEDIUM OF WEBPAGE-BASED MEDIA FILE

CROSS-REFERENCE TO RELATED APPLICATION

The disclosure is a continuation of PCT application Ser. No. PCT/CN2018/103575, filed on Aug. 31, 2018, which claims the priority benefit of CN application Ser. No. 201810530816.3, filed on May 29, 2018. The entirety of the above-mentioned patent application is hereby incorporated by reference herein and made a part of this specification.

TECHNICAL FIELD

The disclosure relates to a media playing technology, and more particularly to a playing method, device and storage medium of a webpage-based media file.

DESCRIPTION OF RELATED ART

The player embedded in the client plays by using Hyper-Text Markup Language (HTML) 5 media elements of the webpage. However, in the related art, regardless of the form of the client, playing support can be provided only for streaming media files (such as HTTP Live Streaming (HLS)). For media files in a non-streaming media format in the network, such as Moving Picture Experts Group (MPEG)-4 files, the player cannot play the media files in the non-streaming media format through a webpage unless format conversion is carried out in advance because MPEG files do not support streaming media playing by itself.

SUMMARY

Accordingly, embodiments of the disclosure provide a playing method, device and storage medium of a webpage-based media file capable of playing a media file of a non-streaming media format by a player built-in a webpage.

On a first aspect, an embodiment of the disclosure provides a playing method of a webpage-based media file, including analyzing moov encapsulated in an moov box of a media file to obtain media information configured for describing media data encapsulated in an mdat box of the media file by a player built-in a webpage, according to time and a position of the media data represented by the media information, obtaining a section of media data in the mdat box of the media file, encapsulating the obtained section of media data and moov describing the section of media data according to a box structure of a fragmented media file to obtain a corresponding fragmented media file; and sending the fragmented media file to a media element of the webpage by a media source extension interface of the webpage for decoding and playing.

The media file adopts a non-streaming media format.

On a second aspect, an embodiment of the disclosure provides a playing device of a webpage-based media file, including an analyzer disposed to analyze moov encapsulated in an moov box of a media file to obtain media information configured for describing media data encapsulated in an mdat box of the media file by a player built-in a webpage, an obtainer disposed to obtain a section of media data in the mdat box of the media file according to time and a position of the media data represented by the media information, an encapsulation disposed to encapsulate the obtained section of media data and moov describing the section of media data according to a box structure of a fragmented media file to obtain a corresponding fragmented media file, and a sender disposed to send the fragmented media file to a media element of the webpage by a media source extension interface of the webpage for decoding and playing.

The media file adopts a non-streaming media format.

On a third aspect, an embodiment of the disclosure provides a playing device of a webpage-based media file, including a memory disposed to store an executable instruction, and a processor disposed to follow the executable instruction stored in the memory to implement the playing method of a webpage-based media file of embodiments of the disclosure.

The executable instruction can be an installation package, a program, codes, a plug-in, a library (a dynamic/static library).

On a fourth aspect, an embodiment of the disclosure further provides a storage medium, storing an executable instruction; when the executable instruction is performed, the playing method of a webpage-based media file can be implemented.

Application of the embodiments of the disclosure renders the following beneficial effects.

1) Media data in a media file of a non-streaming media format are converted into fragmented media files and sent to a media element of a webpage via a media source extension interface for decoding and playing. As the webpage can be embedded in a client, the restriction of playing the non-streaming media format file by the client after complete download can be overcome.

2) The fragmented media file obtained from encapsulation is based on a section of media data of the obtained media file rather than all data of the media file, which can result in a slight delay in conversion without pre-storing in the server. Except for the original media file, no additional storage space of the server is occupied, which can significantly reduce the consumption of the storage space.

3) The media element of the webpage obtains the fragmented media file for decoding and playing by the media source extension interface, rather than playing after acquiring media data based on the real website of the media file, which can result in protecting the real website of the media file.

DETAILED DESCRIPTION OF PREFERRED EMBODIMENTS

The disclosure will be further illustrated in detail with reference to embodiments and drawings therewith. Conceivably, embodiments provided as follows are merely a part of embodiments of the disclosure rather than all of embodiments provided by the disclosure. Without confliction, the technical solution recorded by embodiments of the disclosure can be performed by any combination of manners.

It is necessary to clarify that in embodiments of the disclosure, terms such as "comprise", "include" or any other variation are aimed at covering inclusion without exclusion, so that methods or devices including a series of elements not only contain the recorded elements, but also other unlisted elements, or inherent elements to fulfill the embodiments or devices. Without any further limitation, an element defined by a sentence of "include a" do not exclude other relevant elements existing in methods or devices containing the element, such as steps in methods or components in devices, and components can be some circuits, some processors, some programs or software, etc.

For instance, a playing method of a webpage-based media file provided by an embodiment of the disclosure includes a series of steps, but the playing method of a webpage-based media file provided by an embodiment of the disclosure is not restricted to the recorded steps. Identically, a playing device of a webpage-based media file provided by an embodiment of the disclosure includes a series of components, but the device provided by embodiments of the disclosure is not restricted to the recorded components, which can further include components disposed to acquire relevant information or process information.

Before further expressing the disclosure, substantives and technical terms in embodiments of the disclosure will be explained. The substantives and technical terms in the embodiments of the disclosure refer to following definitions.

(1) A media file indicates a file stores encoded media data such as at least one of audio data and video data in a manner of boxes, which likewise contains moov (aka. metadata), namely data expressing the media data. The moov carries media information to ensure media data to be decoded correctly.

For instance, a file encapsulating media data by an MP4 box format is an MP4 file. Typically, the MP4 file stores advanced video coding (AVC), namely H.264, or video data encoded by the MPEG-4 (part 2) standard and audio data encoded by the advanced audio coding (AAC) standard. There is no doubt that other encoding modes of video and audio will not be excluded.

Figure 1:
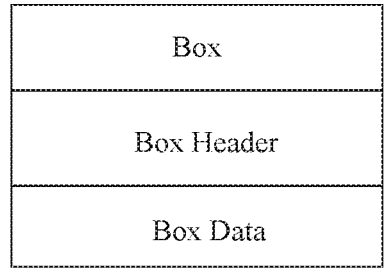
FIG. 1 is an optional structural schematic view of a box provided by an embodiment of the disclosure.

(2) A box is a component of an object oriented defined by a sole type identifier and length, referring to FIG. 1, which is an optional structural schematic view of a box provided by an embodiment of the disclosure, including a box header and box data, and binary data conveying various information filled therein.

Figure 2:
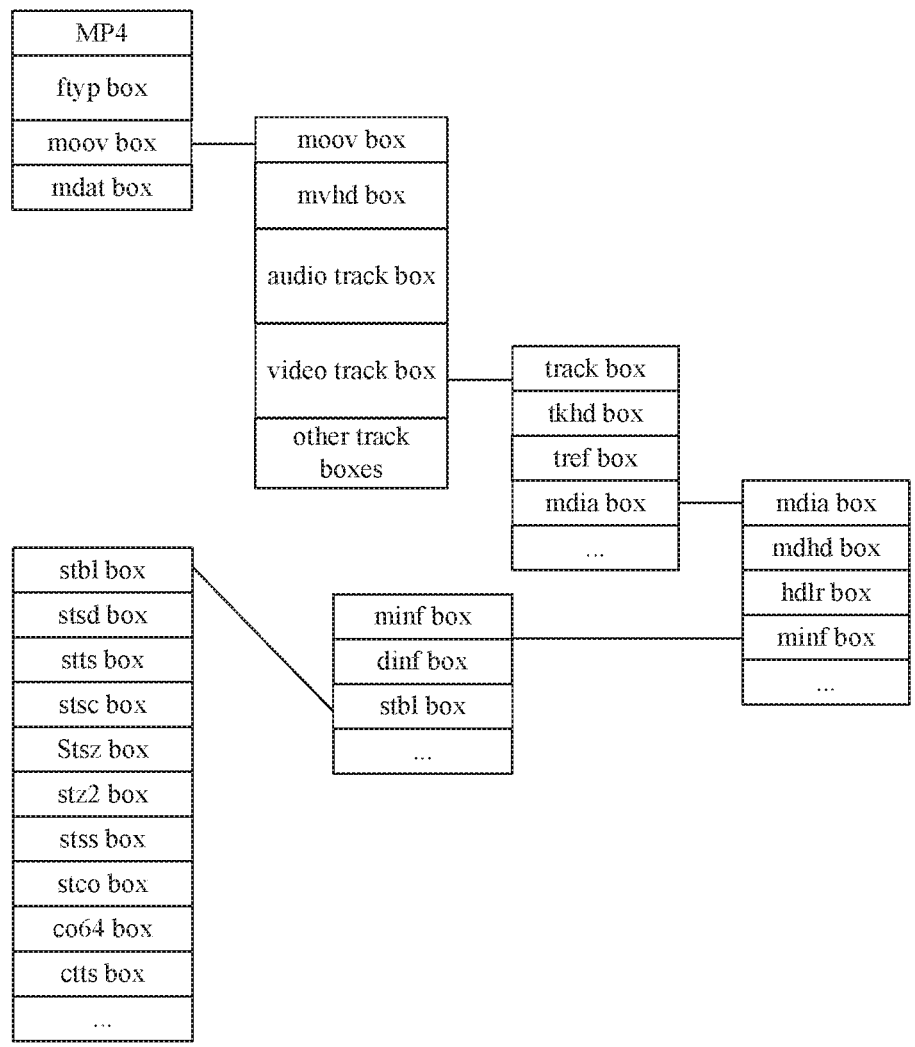
FIG. 2 is an optional schematic view of an encapsulation structure of an MP4 file provided by an embodiment of the disclosure.

The box header includes size and type. The size specifies the volume of the length storage space of the box occupied in the media file. The type specifies the type of the box. Referring to FIG. 2, which is an optional schematic view of an encapsulation structure of an MP4 file in an embodiment of the disclosure. Fundamental types of boxes involved in the MP4 file contain an ftyp box, an moov box and an mdat box.

The box data section can store specific data, and the box is called a data box. The box data section can further encapsulate other types of boxes, and the boxes can be boxes of boxes.

(3) A track is a relevant sample arranged in chronological order in the mdat box. Regarding the media data, the track signifies a video frame sequence or an audio frame sequence, further incorporating a subtitle track synchronized with the video frame sequence. A contiguous set of samples in one track are chunks.

(4) An ftyp box is a box for storing the size, namely a length of occupied bytes, and the type of the file in the media file. As shown in FIG. 2, the binary data stored in the ftyp box describe the type and the compatibility of the file box according to the standard byte length.

(5) An moov box is a box storing moov that is data to depict multimedia data in the mdat box in the media file. Information recorded as binary data stored in the moov box in the MP4 file is called media information.

As shown in FIG. 2, a type of the box of the header of the moov box recorded as binary data is the moov box. The box data division encapsulates an mvhd box storing total information of the MP4 file, which is independent from the MP4 file, and relative to properties of the MP4 file, including duration, creation time and modification time, etc.

The mdat box of the media file can contain sub-boxes corresponding to multi-tracks, such as an audio track box and a video track box. The sub-boxes of the audio track box and the video track box include quotation and description of the media data of corresponding tracks. Necessary sub-boxes include a box describing characteristics and total information such as duration, width and height, which is labelled as a tkhd box, and a box recording media information of tracks such as media types and sampling information, which is labeled as an mdia box.

The sub-boxes encapsulated in the mdia box can include the a box recording relevant properties and contents of tracks, which is labeled as an mdhd box, a box recording playing procedure information of media, which is labeled as an hdlr box, a box describing the media information of media data in tracks, which is labeled as an minf box; the minf box further encapsulates a sub-box to interpret how to locate media information, which is labeled as a dinf box, and a sub-box for recording all the time information such as decoding time and displaying time, location information and encoding/decoding information of samples in tracks, which is labeled as an stbl box.

Figure 3:
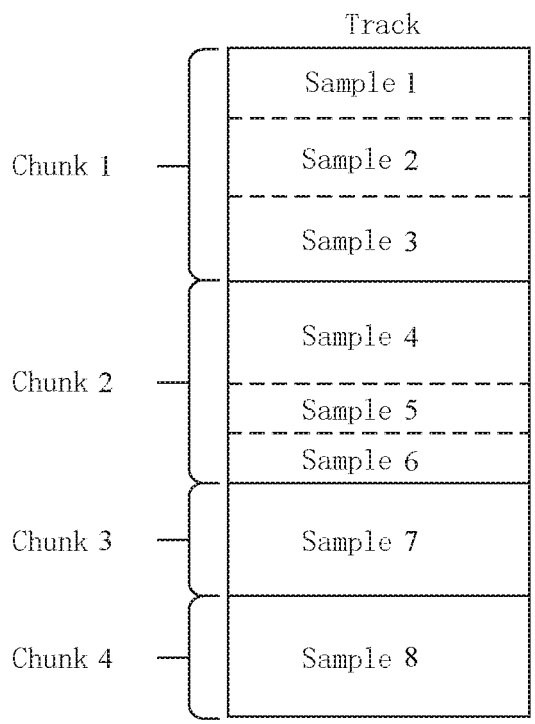
FIG. 3 is a structural schematic view of an mdat box storing media data in a media file provided by an embodiment of the disclosure.

Referring to FIG. 3, which is a structural schematic view of an mdat box storing media data in a media file provided by an embodiment of the disclosure. The time, type, size and location in the mdat box of samples can be explained by media information recognized from binary data in the stbl box. Each of the sub-boxes in the stbl box will be illustrated as follows.

The stsd box includes a sample description table. According to different encoding schemes and quantities of files storing data, each media file can have one or more description tables. The description information of each sample can be found through searching the description table. The description information can guarantee correctness in decoding samples. Each media type stores corresponding description information. For instance, with respect to a video medium, the description information is a structure of an image.

The stts box stores duration information of samples, as well as providing a table for mapping time such as decoding time and the sequence number of a sample. A sample at any time of the media file can be located by the stts box; the stts box further uses other tables to map the size and pointer of a sample. Each entry offers sequence numbers of successive samples in an identical time offset and the offset of samples. An intact mapping table of time-sample can be established by progressively increasing the offsets. A computational formula is as follows.

$$DT(n+1)=DT(n)+STTS(n) \quad (1)$$

Where STTS(n) is the $n^{th}$ information without compression; DT(n) is the display time of the nth sample. An order of the samples is in accordance with the time sequence; therefore, the offset will always be nonnegative. Generally, DT starts from 0, and a computational formula of DT is as follows.

$$DT(i)=\text{SUM}(\text{for } j=0 \text{ to } i-1 \text{ of delta}(j)) \quad (2)$$

The sum of all offsets is the duration of the media data in tracks.

An stss box records sequence numbers of key frames in the media file.

An stsc box records a mapping relation between samples and chunks storing the samples. The table maps the relation between the sequence numbers of samples and those of chunks. The chunk containing a specific sample can be determined by searching the table.

An stco box defines the location of each chunk in tracks. The location is represented by the offset of an initial byte of the mdat box and a length corresponding to the initial byte, namely a size.

An stsz box records a volume/size of each sample in the media file.

(6) An mdat box is a box for storing multimedia data in the media file. For instance, an mdat box in an MP4 file, as shown in FIG. 3, a sample is a unit stored in the mdat box. In a chunk stored in the media file, lengths of chunks and those of samples can mutually be different.

(7) A fragmented media file is a sub-file formed by dividing the media file. Each fragmented media file can be decoded independently.

Taking the MP4 file as an example, the media data in the MP4 file is divided according to the key frames. The divided media data and corresponding moov are encapsulated to form a fragmented MP4 (FMP4) file. The moov in each FMP4 file can ensure the media data to be decoded correctly.

Figure 4:
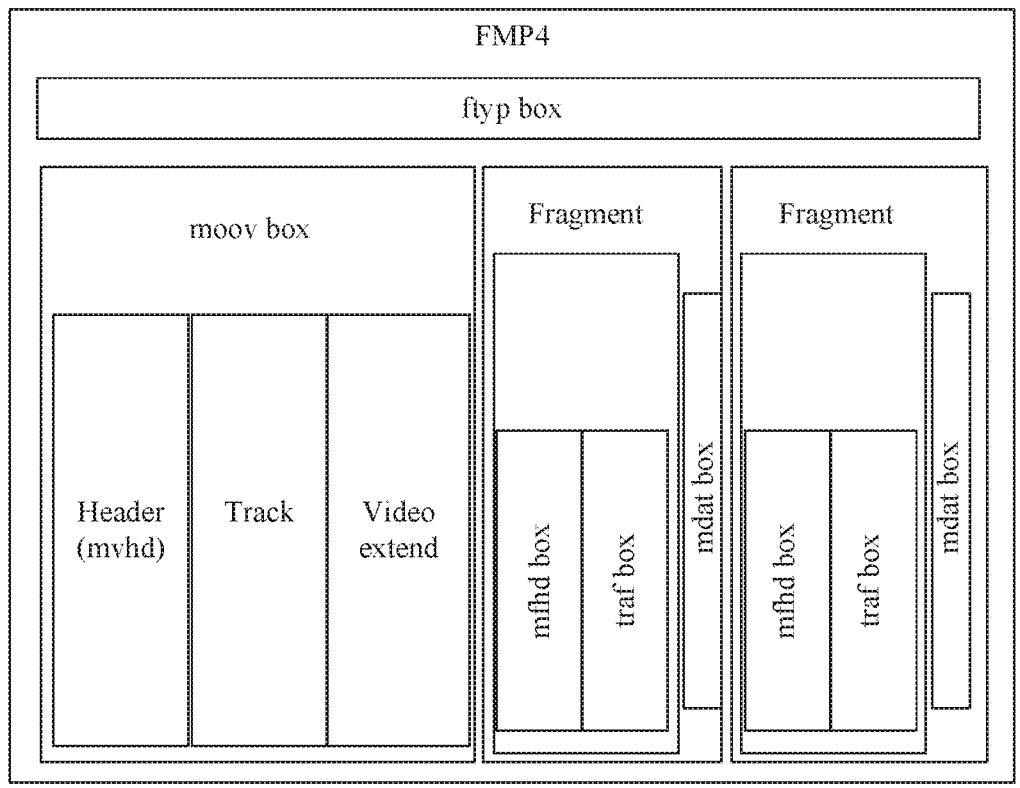
FIG. 4 is an optional schematic vie of an encapsulation structure of a fragmented MP4 file provided by an embodiment of the disclosure.

For instance, when the MP4 file as shown in FIG. 2 is converted to multiple FMP4 files, referring to FIG. 4, which is an optional schematic view of an encapsulation structure of an FMP4 file provided by an embodiment of the disclosure. One MP4 file can be converted to be multiple FMP4 files. Each FMP4 file includes three basic boxes—an moov box, an moof box and an mdat box.

The moov box includes the MP4-leveled moov, which is used for describing all media data of the MP4 file that the FMP4 files derived from, such as the duration, creation time and modification time of the MP4 file.

An moof box stores the fragmented moov, which describes media data encapsulated in the FMP4 file therein to ensure the media data in the FMP4 file to be able to be decoded.

One moof box and one mdat box constitutes one fragment of the fragmented MP4 file. One fragmented MP4 file can include one or more fragments. The moov encapsulated in each fragment guarantees media data encapsulated in fragments to be decoded independently.

(8) A media source extensions (MSE) interface is an interface orienting players embedded in the network, which is interpreted by an interpreter during loading a webpage and achieved by running the frontend programming language such as JavaScript, with a function of providing playing media stream of the media element invoking Hyper Text Markup Language (HTML) to players, such as utilizing the video element and the audio element to perform functions of the video/audio.

(9) A streaming media encapsulation format streaming media format is a media file encapsulating media data to be streaming media. The media file is unnecessary to be completely downloaded or additionally transcoded for being decoded and played. In other words, the encapsulation technology originally supports downing and playing at the same time. A typical file of the streaming media encapsulation format streaming media format can be such as a TS media file fragmentation based on the HTTP Live Streaming (HLS) technique, flash video (FLV) and so on.

(10) A non-streaming media encapsulation format streaming media format is an encapsulation technology of decoding and playing after encapsulating media data to be a media file and completely downing the media file. A typical file of the non-streaming media encapsulation format streaming media format includes an MP4 file, a windows media video (WMV) file, an advanced streaming format (ASF) file and so on.

It is necessary to point out that the MP4 file originally fails to play in a form of streaming media, but the technical effect of downing and playing at the same time can be acquired by online transcoding and subsequently delivering the transcoded streaming media to the player, or filling invalid binary data into the blank section of the incompletely downloaded MP4 file such as filling a blank section of an mdat box with invalid binary data when an ftyp box and an moov box are entirely downloaded. In the disclosure, encapsulation formats reject files of playing streaming media originally are defined to be non-streaming media formats.

First, a load control device of a media player of an embodiment of the disclosure will be introduced. The load control device of the media player provided by the embodiment of the disclosure can be various sorts of subscriber terminals such as a smart phone, a tablet, a laptop and so on. Exemplary applications of the device acting as the subscriber terminal will be illustrated as follows.

Figure 5:
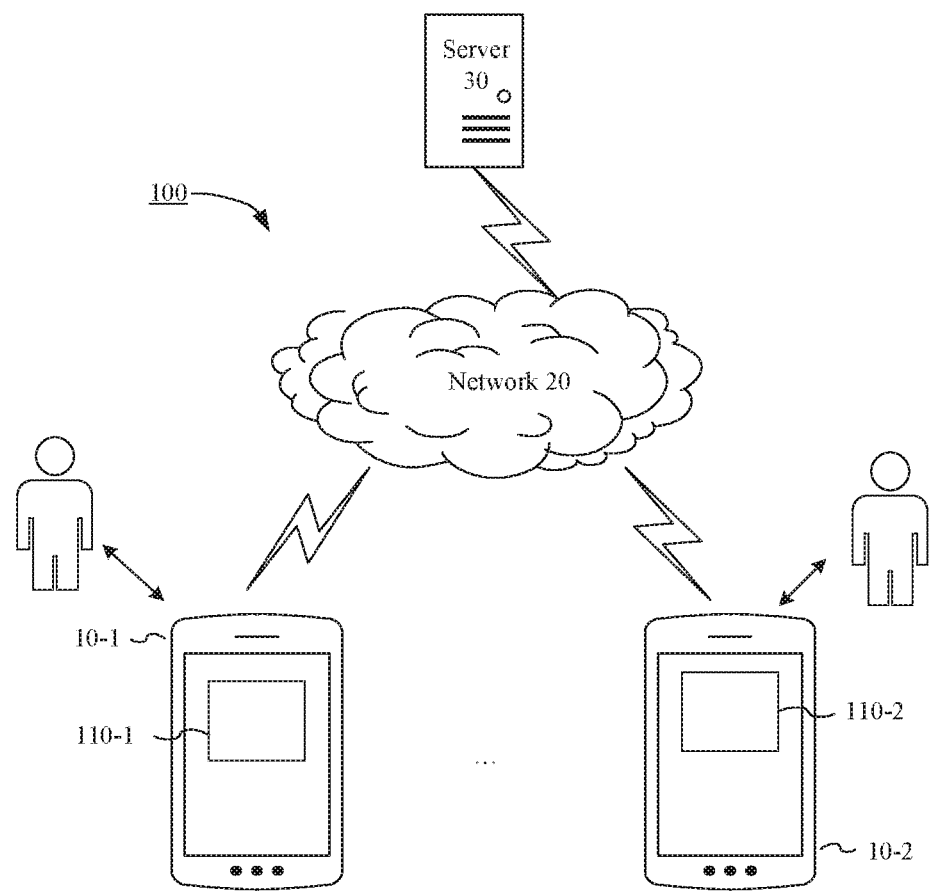
FIG. 5 is a schematic view of a framework of a load control system of media playing provided by an embodiment of the disclosure.

Referring to FIG. 5, FIG. 5 is a schematic view of a framework of a load control system 100 of media playing provided by an embodiment of the disclosure. In order to provide an exemplary application, a subscriber terminal 10 (exemplarily showing a subscriber terminal 10-1 and another subscriber terminal 10-2) is connected to a server 30 over a network 20. The network 20 can be a wide area network or a local area network, or a combination of both, which transmits data over a wireless link.

The subscriber terminal 10 plays a media file by a player built in a webpage, and shows contents through a graphical interface 110 (exemplarily showing a graphical interface 110-1 and another graphical interface 110-2). During the broadcast/playing, the subscriber terminal 10 analyzes the moov encapsulated in the moov box of the media file by the player built-in the webpage to obtain media information configured for describing media data encapsulated in the mdat box of the media file. The media file employs the non-streaming media format; according to the time and position of the media data represented by the media information, a portion of the media data in the mdat box of the media file are obtained from the server 30; the obtained portion of media data and the moov describing the portion of media data are encapsulated according to the box structure of the fragmented media files to obtain corresponding fragmented media files; the fragmented media files are sent to the media element of the webpage through the media source extension interface of the webpage for decoding and playing.

The playing device of a webpage-based media file of the embodiment of the disclosure will be illustrated as follows. The playing device of a webpage-based media file can be provided as hardware, software or a combination of both.

Figure 6:
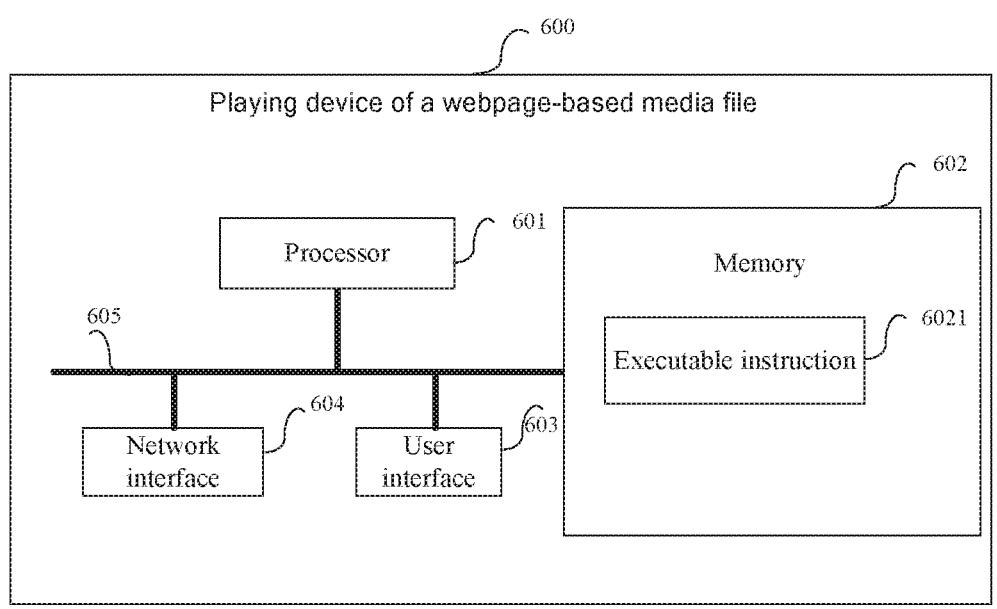
FIG. 6 is a first structural schematic view of a playing device of a webpage-based media file provided by an embodiment of the disclosure.

The implement of the combination of software and hardware of the playing device of a webpage-based media file is illustrated. Referring to FIG. 6, FIG. 6 is an optional structural schematic view of a playing device of a webpage-based media file provided by the embodiment of the disclosure. The hardware structure of the playing device of a webpage-based media file of the embodiment of the disclosure will be introduced in detail as follows. Conceivably, FIG. 6 merely shows an exemplary structure rather than all the structures of the playing device of a webpage-based media file, and a part of the structure or all the structures as shown in FIG. 6 can be performed according to the requirement.

A playing device of a webpage-based media file 600 provided by an embodiment of the disclosure includes at least one processor 601, a memory 602, a user interface 603 and at least one network interface 604. Various components in the playing device of a webpage-based media file are coupled together by a bus system 605. Conceivably, the bus system 605 is utilized to connect and communicate the components. Besides the data bus, the bus system 605 further includes a power bus, a control bus and a status signal bus. But for the sake of clear illustration, all sorts of buses in FIG. 6 are marked as the bus system 605.

The user interface 603 can include a display, a keyboard, a mouse, a trackball, a click wheel, a key, a button, a touch panel or a touch screen.

Conceivably, the memory 602 can be a volatile memory or a nonvolatile memory, or both.

The memory 602 in the embodiment of the disclosure is configured for storing various sorts of data to support the operation of the playing device of a webpage-based media file 600. Examples of the data include any executable instruction configured for running in the playing device of a webpage-based media file 600, such as an executable instruction 6021, and programs of the playing method of a webpage-based media file of the embodiment of the disclosure can be included in the executable instruction 6021.

The playing method of a webpage-based media file disclosed by the embodiment of the disclosure can be used in the processor 601, or fulfilled by the processor 601. The processor 601 can be an integrated circuit chip with abilities to process signals. During the process, each of steps of the playing method of a webpage-based media file can be fulfilled by an integrated logic circuit of in the form of hardware or commands in the form of software in the processor 601. The aforementioned processor 601 can be a communication processor, a digital signal processor (DSP) or other programmable logic devices, a discrete gate, a transistor logic device, or a discrete hardware component, etc. The processor 601 can implement or perform the methods, steps and logic diagrams in the embodiments of the disclosure. The communication processor can be a microprocessor or any other conventional processor. Combined with the steps of methods disclosed by embodiments of the disclosure, the result can be processed by hardware decoding processors or mixture of hardware and software in decoding processors. Software modules can be in the storage medium. The storage medium is in the memory 602. The processor 601 reads information in the memory 602, and accomplishes steps of the playing method of a webpage-based media file provided by the embodiments of the disclosure with the aid of hardware.

The hardware achievement of the playing device of a webpage-based media file will be illustrated below. The playing device of a webpage-based media file in embodiments of the disclosure can be fulfilled by one or more application specific integrated circuit (ASIC), digital signal processing (DSP), programmable logic device (PLD), complex programmable logic device (CPLD), field-programmable gate array (FPGA) or other electrical elements, configured for performing the playing methods of a webpage-based media file provided by embodiments of the disclosure.

The software achievement of the playing device of a webpage-based media file will be illustrated below. The playing device of a webpage-based media file in embodiments of the disclosure can be fulfilled by application programs or plug-ins, or a combination of both.

As an example, an application program can be a client specific for playing the media file, or a client with an optional service of the playing function of the media file, which will be activated by installing a corresponding plug-in.

As an example, the plug-in can upgrade installation package for application programs and add the playing function of the media file in specific application programs; or an element in a webpage of media players employs the frontend language. The function of playing media files is achieved via directly read by the browser to perform in the webpage.

The following will take the player built-in a webpage and the player playing the media file by using the media element of the webpage as an example to illustrate the playing method of a webpage-based media file provided by the embodiment of the disclosure. The webpage in the embodiments of the disclosure can be a webpage of a browser or a webpage of an application (APP) embedded in a core of the browser. The webpage performs the player by analyzing and executing JavaScript (JS) codes of the player.

Figure 7:
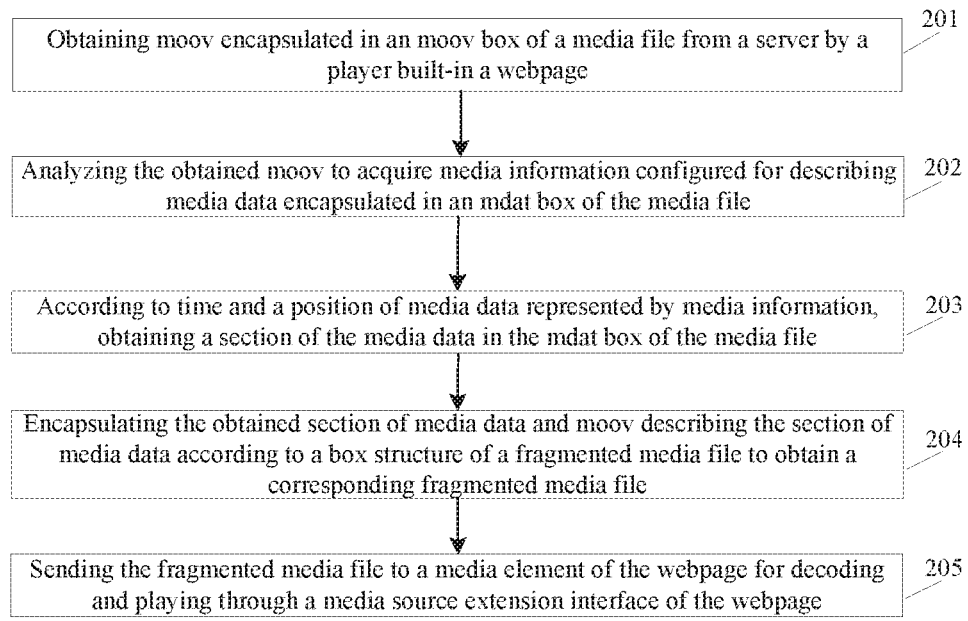
FIG. 7 is a first schematic flowchart of a playing method of a webpage-based media file provided by an embodiment of the disclosure.

FIG. 7 shows an optional schematic flowchart of a playing method of a webpage-based media file provided by an embodiment of the disclosure. Referring to FIG. 7, a playing method of a webpage-based media file provided by the embodiment of the disclosure involves steps 201 through 205, each of which will be described below.

Step 201, the moov encapsulated in the moov box of the media file is obtained by a player built-in a webpage from a server.

In one embodiment, the player plays the media file in the webpage. The media file adopts a non-streaming media format, such as MP4/MKV/WMV/ASF or the like.

In one embodiment, the player may obtain the moov encapsulated in the moov box of the media file in a manner that: the player sends a network request carrying set offset and size to the server so as to obtain binary data which start from zero byte and conform to the set size in the media file returned by the server; the moov in the moov box is identified from the binary data returned by the server.

The set size can be obtained according to the ftyp box and size statistics of the moov box of the existing media file, so that the set size can cover the sum of the ftyp box and capacities of the moov box of a set proportion (e.g. all) of the media file; as a result, when the encapsulation structure of the media file is in the situation that the ftyp box, the moov box and the mdat box are sequentially encapsulated, complete moov encapsulated in the moov box can be obtained by one-time request, so that the connection occupation (luring network transmission is saved, and the situation that the response delay due to connection unavailable in non-media playing services in the webpage caused by connection occupation can further be avoided.

Taking the media file is the MP4 file as an example, the moov encapsulated in the moov box acquired by the player is the binary data encapsulated in the moov box in the MP4 file, and when the encapsulation structure of the MP4 file is in the situation that the fytp box, the moov box and the mdat box are sequentially encapsulated, the set size can be obtained according to the size statistics of the ftyp box and moov box of the existing MP4 file. It can be ensured that the set size covers the sum of binary data of the ftyp box and the moov box of a set/given proportion (e.g. all) of the MP4 file, and that the complete binary data in the moov box can be requested from the server to be included in most cases once.

In one embodiment, in binary data requested by the player from the server through set offset and size, a segment of binary data starting from zero byte correspond to the ftyp box; the player obtains the size of the ftyp box by reading the box header, and knows the type and size of the next box by reading the header of the second box, and when the type of the second box is an moov box and the size of the returned binary data is not less than the sum of the size of the ftyp box and the size of the moov box, it is indicated that the binary data requested from the server through the set offset and the set size include the moov encapsulated in the moov box; when the type of the second box is an moov box and the size of the returned binary data is smaller than the sum of the size of the ftyp box and the size of the moov box, it is indicated that the binary data requested from the server through the set offset and the set size fail to include the moov encapsulated in the moov box. When the binary data requested by the player from the server through the set offset and size include the incomplete moo in the moov box, the player needs to read the size of the box from the binary data returned from the server, and calculate the offset and size of the moov box according to the header of the moov box, and carry the calculated offset and size in the network request to request the moov from the server; and the server starts to read binary data from the offset calculated in the media file according to the request, while the read binary data conform to the calculated size, and the data are returned to the player.

As an example, the player reads the size of the box from the binary data returned by the server, and calculates the offset and the size of the moov box according to the header of the moov box, which relate to the following two cases.

Case 1) When the type of the box read from the remaining binary data (i.e., the data other than the binary data of the ftyp box among the returned binary data) is an moov box, and the size of the remaining binary data is smaller than the size of the moov box, the difference between the size of the moov box and the size of the remaining binary data is calculated as a new size of the secondary request. Binary data are requested from the server for the second time by taking the sum of the offset and the size requested for the first time as a new offset.

Case 2) When the type of the box read from the remaining binary data is an mdat box, the sum of the size of the mdat box and the size of the ftyp box is calculated as a new offset of the secondary request, and the binary data are requested from the server a second time with a set size (which may be an empirical value capable of covering the size of the moov box).

Taking the media file to be an MP4 file as an example, the binary data requested by the player from the server through the set offset and size fail to contain the complete binary data of the moov box, and at the moment, the player needs to read the type and size of the box from the binary data returned from the server to determine the offset and size of the moov box in the MP4 file.

A starting byte of the binary data of the MP4 file always corresponds to the ftyp box; the binary data of the ftyp box are identified from the returned binary data, and the length thereof can be known according to the header of the ftyp box, so that the binary data of the next box can be read from the remaining binary data according to the standard length of the header, and the box type represented by the header includes the following situations.

1) When the type of the box read from the remaining binary data (i.e., the data other than the binary data of the ftyp box in the returned binary data) is an moov box, and the size of the remaining binary data is not less than the size of the moov box, according to the determined offset and size, the moov which starts from the offset of the moov box in the MP4 file and conforms to the size of the moov box in the MP4 file can be obtained from the server.

2) When the type of the box read from the remaining binary data is an moov box, and the size of the remaining binary data is smaller than the size of the moov box, the difference between the size of the moov box and the size of the remaining binary data is calculated as the new size of the secondary request, and the binary data are requested from the server for the second time by taking the sum of the offset and the size requesting for the first time as the new offset of the secondary request.

3) When the type of the box read from the remaining binary data is the mdat box, the sum of the size of the mdat box and the size of the ftyp box is calculated as a new offset of the secondary request, and the binary data are requested from the server for the second time with the set size.

Therefore, regardless of the encapsulation structure of the media file, namely regardless of the encapsulation sequence of the ftyp box, the moov box and the mdat box in the media file, the moov in the moov box can be obtained from the server by the player with at most two requests, which can improve the acquisition efficiency of the moov.

As an example, for an MP4 file, a segment of binary data starting from zero byte returned by the server correspond to an ftyp box according to the encapsulation standard of the MP4 file, and the size (i.e. length) of the ftyp box and the size of a complete MP4 file can be read from the header of the ftyp box according to the encapsulation standard of the header of the box; it can be assumed that the size of the ftyp box is a (in bytes), the header information of the subsequent box is read from a+1 to obtain the type and size of the subsequent box, and if the ftyp box is followed by the moov box through reading, and the size of the remaining binary data (the set size can be the size of the ftyp box) is larger than the size of the moov box, it indicates the complete binary data of the moov box are retrieved. The moov in the moov box can be extracted from the remaining binary data according to the offset and size of the moov box.

Step 202, media information of the media file encapsulated in the mdat box configured for describing the media file is obtained by analyzing the obtained moov.

After the player acquires moov encapsulated in the moov box from the server, a nested structure of sub-boxes in the moov box is analyzed, and the binary data in each sub-box are read out according to the nested structure of the sub-boxes; and the media information of the media data characterized by each sub-box is parsed from the read binary data. In the practical application, the media information may include information such as offset, size, decoding time, etc. of video frames and/or audio frames in the media file.

Taking the media file to be an MP4 file as an example, the metadata box is the moov box. With reference to FIG. 2, it can be seen that an mvhd box and a track box are encapsulated in the moov box; information such as creation time, modification time, a time measurement scale, playable duration, default volume and the like of the MP4 file can be obtained by parsing binary data of the mvhd box; the moov box includes numerous track boxes, which record description information specific to each media track. For example, for a video track box, multilayer sub-boxes are nested in the video track box, and video frame information and corresponding picture information of an MP4 file are obtained by parsing corresponding binary data on the basis of a nested structure of the video track box.

In one embodiment, the player can parse the acquired moov to obtain media information in the following manner of: sequentially parsing/analyzing binary data with a standard length corresponding to the box header in the binary data of the moov box to obtain the box type of the sub-box and the length of the box data of the sub-box in the moov box; invoking/calling a parser of a type corresponding to the box type of the sub-box, and sequentially parsing binary data corresponding to the length of the box data in unparsed data to obtain media information represented by the box data.

Aiming at the situation that an amount of sub-boxes are nested in the moov box, the offset of the binary data read by the player each time is the sum of the lengths of the sub-boxes that have been identified, and the length of the read binary data conforms to the standard length of the box header, so that the types and the lengths of the currently processed sub-boxes can be analyzed.

For example, when it is read for the first time, binary data are read from zero byte of binary data of the moov box, and the length of the read binary data conforms to the standard length of the box header, so that the type and the length of the first sub-box can be analyzed; when it is read for the second time, the binary data start to be read by taking the length of the sub-box read for the first time as an offset, and the length of the read binary data conforms to the standard length of the box header, so that the type and the length of the second sub-box can be analyzed.

According to the method for reading the binary data in previous context, the situations that the binary data are read back due to multiple reads and the binary data are read again due to less reads will not occur, and the analysis efficiency and the accuracy can be guaranteed.

In one embodiment, a typical box type nested within the moov box is pre-labeled to indicate whether the box is directly used to encapsulate binary data or further encapsulates a box, such as the mvhd box, the audio track box, the video track box and the like shown in FIG. 2, which further encapsulate a box; and the stts box, stsd box and the like shown in FIG. 2 directly encapsulate binary data.

For the box type marked as directly encapsulating binary data, a parser corresponding to the box type one by one can be disposed, and the parser is used for parsing the represented media information according to the binary data; the box type of the parsed sub-box is compared with the pre-marked box type, which involves the following two cases.

Case 1) When it is determined through comparison that the box type of the sub-box is pre-marked for directly encapsulating/packaging binary data, a parser corresponding to the box type of the sub-box is called, and the box data in the sub-box is parsed by the parser to obtain media information represented by the box data.

Case 2) when it is determined through comparison that the box type of the sub-box is pre-marked for continuing to package the box, binary data corresponding to the sub-box are recursively parsed according to the standard length of the box header in the media file until it is parsed that the box type of the packaged box in the sub-box is pre-marked for directly packaging the binary data, and a parser corresponding to the box type of the box packaged in the sub-box is called, and binary data will be parsed byte by byte; the length of the parsed binary data corresponds to the length of the box data of the box packaged in the sub-box so as to obtain media information represented by the box data of the box packaged in the sub-box.

In one embodiment, a method for recording media information in a process of parsing moov box is described. When binary data with the standard length corresponding to of the box header in binary data of the moov box are sequentially parsed to obtain the box type of the sub-box in the moov box, an object is established according to a nested relationship between the sub-box and the box to which the sub-box belongs and a nested relationship between the sub-box and the packaged box; when the box type of the sub-box is pre-marked for directly packaging binary data, an array including media information is stored in the object created correspondingly to the sub-box, and the stored media information is represented by the box data of the sub-box.

For example, in FIG. 2, when the type of the parsed sub-box is an stts box, since the stts box is pre-marked as directly packaging binary data, an array including media information, which is duration information represented by the box data of the stts box, is stored in the object established correspondingly to the stts box.

In one embodiment, the method in which nested relationships between sub-boxes are recorded in the process of parsing the moov box is described. When binary data corresponding to the standard length of the box header of binary data in moov box are sequentially parsed to obtain the box type of the sub-box in the moov box, if the box type is pre-marked as directly encapsulating binary data, the parsed sub-box is recorded in the called parser; an instance of the recorded sub-box is disposed into a sub-box attribute, and the sub-box attribute is included in the box to which the sub-box belongs, which is configured for describing the nested relationship between the sub-box and the box to which the sub-box belongs.

For example, in FIG. 2, when the type of the parsed sub-box is the stsd box, since the stsd box is pre-marked as directly packaging binary data, the stsd box is recorded in the parser corresponding to the stsd box, and the instance of the stsd box is disposed into the stbl box sub-box attribute, and so on, and finally multiple sub-boxes such as the stsd box, the stts box, the stse box and the like that are nested in stbl box are recorded in the sub-box attribute of the stsd box.

In one embodiment, when it is determined through comparison that the box type of the sub-box is not pre-marked or is pre-marked as directly packaging binary data but without invoking the parser of the corresponding type, the binary data corresponding to the sub-box is ignored to be parsed, and it is jumped to the part corresponding to the next sub-box in the binary data for continuing parsing according to the length of the sub-box.

In fact, a user-defined box type can appear in the media file; the overall analysis progress of the moov box is not affected in a skip mode; meanwhile, when the box type of the moov box changes, compatible analysis of the latest moov box can be quickly realized by adding, deleting and modifying the parser of the corresponding type in a manner of disposing the parser, which has the characteristics of flexibility and rapidness in upgrade.

Step 203, a portion of the media data in the mdat box of the media file are acquired according to the time and the position of the media data represented by the media information.

In one embodiment, the player may obtain a part of the media data in the mdat box of the media file by reading the position and time of the media data from the media information, searching two key frames whose time span includes a given (time) period from the time of the media data and audio frames aligned with video frames between the two key frames; searching the position of the video frames between the two key frames and the position of the aligned audio frames in the media file from the position of the media data; and acquiring media data in a corresponding position in the mdat box of the media file. The media data includes one or more video frames and one or more audio frames.

In one embodiment, searching the time span includes two key frames of a given time period, namely two key frames defining the given time period, which can be a first key frame and a second key frame; the given time period includes a time period formed by the decoding time of the first key frame and the decoding time of the second key frame, and there can be no other key frame between the first key frame and the second key frame, i.e. the second key frame is a key frame which appears for the first time following the first key frame; alternatively, there may be other key frames between the first key frame and the second key frame, i.e. the second key frame is not the first key frame occurring after the first key frame.

In one embodiment, parameters influencing the length of the given time period are described; the starting time of the given time period is the time corresponding to the playing point, and the length of the given time period can be obtained by adaptation according to network parameters or characteristic parameters of a webpage embedded with the player, or can be set according to practical requirements.

Taking the network parameter to be the downlink network bandwidth for data transmission as an example, the adaptation of a given time period is explained. The longer the given time period, the larger the amount of media data corresponding to the given time period will be, and the amount of media data requested to be obtained from the server after the playing point is updated will be larger with heavier occupation laid upon the downlink network bandwidth; i.e. there is a positive correlation between the length of the given time period and the downlink network bandwidth. Therefore, in order to ensure the transmission performance of the network, the player can adapt the length of the given time period based on the current downlink network bandwidth, and a positive correlation between the length of the given time period and the bandwidth of the downlink network.

Taking the network parameter to be the transmission flowrate of data transmission as an example, the adaptation of a given time period of time is explained. The longer the given time period, the larger the amount of media data corresponding to the given time period will be, and the media data flowrate requested by the player from the server after the playing point is updated will be larger. Therefore, in order to ensure the transmission performance of the network, the larger the current transmission flowrate for media data transmission, the smaller the given time period needs to be set, i.e. there is a negative correlation between the transmission flowrate and the length of the given time period, and the player can determine the length of the given time period based on the current transmission flowrate of data transmission, and the negative correlation between the transmission flowrate and the length of the given time period.

Taking the feature parameter to be the number of playing windows in the webpage as an example, the adaptation of a given time period of time is explained. The greater the number of playing windows in the webpage, the greater the number of data interactions between the webpage and a server will be, as well as the greater network load pressure. Therefore, in order to ensure the network performance, when the number of playing windows in the webpage is larger, the length of the given time period needs to be set shorter, i.e. the number of playing windows has a negative correlation with the length of the given time period, and the player can determine the length of the given time period based on the number of playing windows in the current webpage, and the negative correlation between the number of play windows and the length of the given time period.

Next, it will be discussed that two key frames are determined according to a given time period; a time period with the decoding time of the two key frames as the end point includes the given time period; the media between the two key frames is regarded as the media data with the given time period to construct fragmented media files for playing; the given time period is used for continuing the real-time playing point of the player so as to realize continuous playing of the media file.

As for the playing point, the playing point can be a playing point achieved by continuously playing the media file (i.e. automatically playing without intervention by the user); for example, from the playing point at the $30^{th}$ minute to the playing point at the $40^{th}$ minute; it is also possible to reach the playing time by means of jumping over the media file (i.e. the user clicks a progress bar via a cursor to realize page jumping). For example, the original playing point is 20% of the playing progress, and the playing point after jumping is 30% of the playing progress.

In one embodiment, the method for determining two key frames (set as a first key frame and a second key frame after the first key frame of the decoding time) is described according to the situation that the video frame corresponding to the playing point and the video frame corresponding to the end time of the given time period are common frames or key frames, aiming at the situation that the playing point reaches the playing time by continuously playing the media file.

Case 1) the video frame corresponding to the playing point is a common frame, and since the player takes the media data between two key frames as a basic play loading unit, the media data after the playing point and before the first key frame following the playing point (the key frame closest to the playing point among the key frames later than the playing point at decoding time) are loaded media data. In order to avoid repeatedly acquiring the part of loaded media data, the first key frame of the two key frames of the given time period is: the first key frame in the media file that is immediately decoded after the playing point.

Case 2) the video frame corresponding to the playing point is a key frame, and the first key frame of the two key frames in the given time period is: the key fame corresponding to the playing point, i.e. the key frame aligned with the starting time of the given time period.

Case 3) if the video frame corresponding to the end time of the given time period is a common frame, and since the player takes the media data between two key frames as a basic playing loading unit, if the key frame before the end time is taken as a second key frame of the given time period, the media data between the key fame and the video frame corresponding to the end time will be missed. When the media file is played, media data between the key frame before the end time and the video frame corresponding to the end time cannot be played and the frames are skipped. Therefore, in order to ensure that the video frame corresponding to the end time of the given time period can be normally played without frame skipping, the second key frame in the two key frames of the given time period is: the key frame closest to the end time among the key frames of which the decoding time is later than the end time of the given time period.

Case 4) the video frame corresponding to the end time of the given time period is a key frame, and the second key frame of the two key frames of the given time period is: the second key frame that the decoding time aligns with the end time of the given time period, i.e. the key frame aligned with the end time of the given time period.

In the above-mentioned cases 1) and 3), taking the key frame crossing the playing point as the end point of the media data of the given time period, it can be ensured that the video frame corresponding to the playing point has sufficient information for correct decoding without skipping the frame due to the lack of decoding data (i.e. the key frame).

In the above-mentioned cases 2) and 4), in the case that the playing point aligns with the key frame, the aligned key frame is directly taken as the end point of the media data in the given time period, and the situation that requested redundant data can be reduced to the maximum extent, which can prevent the non-media playing service in the webpage from being delayed due to the occupation of connection and flowrate.

In another embodiment, the method for determining two key frames (set as a first key frame and a second key frame after the first key frame of the decoding time) is described according to the situation that the video frame corresponding to the playing point and the video frame corresponding to the end time of the given tune period are common frames or key frames, aiming at the situation that the playing point reaches the playing time by means of jumping.

Case 1) the video frame corresponding to the playing point is a common frame, and since the playing point is reached by jumping, the media data between the first key frame before the playing point and the playing point will not be loaded, and the first key frame is: the first key frame in the media file where the decoding time precedes the playing point, i.e., the key frame whose decoding time is earlier than the starting time of the given time period and closest to the starting time is searched in the time of the media data (i.e., the correspondence between the sequence number represented by the media information and the decoding time of the frame).

The media data between the key frames from the playing point to the previous stage of the playing point are additionally requested, so that normal decoding can be guaranteed when jumping to any playing point, and the situation that frame skipping due to decoding failure when the playing point corresponds to the common frame.

Case 2) the video frame corresponding to the playing point is a key frame, and the first key frame is: the key frame corresponding to the playing point, that is, the key frame the decoding time of which searched from the time of the media data (that is, the corresponding relationship between the sequence number represented by the media information and the decoding time of the frame) is aligned with the starting time of the given time period of time.

Case 3) the video frame corresponding to the end time of the given time period is a common frame, and the second key frame is: the key frame whose decoding time is later than the end time of the given time period and is closest to the end time.

In the above-mentioned cases 1) and 3), taking the key frame crossing the playing point as the end point of the media data of the given time period, it can be ensured that the video frame corresponding to the playing point has sufficient information for correct decoding without skipping the frame due to the lack of decoding data (i.e. the key frame).

Case 4) the video frame corresponding to the end time of the given time period is a key frame, and the second key frame is: the key frame of which the decoding time aligns with the end time of the given time period.

In cases 2) and 4), the media data to be acquired are defined by aligning the key frames of the playing points; on the premise that the playing points can be decoded correctly, the situation of acquiring unnecessary media data is reduced to the maximum extent, the occupation of connection and flow is reduced, and the real-time performance of non-media playing services in the webpage is further guaranteed.

In one embodiment, the player may look for audio frames aligned with the given time period from the time of the media data by: searching audio frames whose decoding time is distributed according to a given time period from the time of the media data, and positioning time-synchronized audio frames with the video frames by taking the video frames as a reference; when the time of the playing point corresponds to the audio frame, the decoding time of the first audio frame is aligned with the starting time of the given time period; when the time of the playing point fails to correspond to an audio frame, the decoding time of the first audio frame is earlier than the starting time of the given time period and closest to the starting time, and the decoding time of the first audio frame is ensured not to be later than the start decoding time of the first video frame (the first key frame); when the end time of the given time period corresponds to an audio frame, the decoding time of the last audio frame is aligned with the end time of the given time period; when the end time of the given time period fails to correspond to an audio frame, the decoding time of the last audio frame is later than the end time of the given time period and closest to the end time, and the decoding time of the last audio frame is guaranteed not to be earlier than the decoding time of the last video frame (the second key frame). Therefore, the problem that the video and audio durations in the media files are inconsistent can be solved; synchronous audio playing can be guaranteed when each frame of video is played, and the phenomenon that pictures do not sound will not occur.

In one embodiment, a player may obtain media data at a corresponding location in the mdat box of the media file by the manner that: the player determines an interval formed by the minimum offset and the maximum size according to the offset and the size corresponding to the position of the video frames between the two key frames in the given time period, and the offset and the size corresponding to the position of the audio frames aligned with the video frames between the two key frames; and media data in a corresponding interval of the mdat box of the media file is acquired.

Here, the determination of the interval consisting of the minimum offset and the maximum size is explained. The position of the video frame in the moov box is located by the offset and the size of the video frames in the media file between the first key frame and the second key frame of the two key frames, and the position of the audio frame in the moov box is located by the offset and the size of the audio frames aligned with the video frames in the media file. Taking an interval formed by the upper limit and the lower limit of the positions as a target interval, namely an interval formed by the minimum offset and the maximum size. The offset and the size corresponding to the upper limit of the positions are the offset and the size corresponding to the upper limit of the target interval, and the offset and the size corresponding to the lower limit of the positions are the offset and the size corresponding to the lower limit of the target interval.

In practical applications, the target interval is the smallest interval in which video frames and audio frames are stored in the mdat box of the target resolution media file; for example, the offset of the video frames between the first key frame and the second key frame at the position of the target resolution media file corresponds to an interval of [a, b] (the address is in ascending order); the offset of the audio frame at the position of the target resolution media file corresponds to an interval of [c, d] (the address is in ascending order), and then the interval formed by the upper limit and the lower limit of the positions is [min (a, c); max (b, d)].

Thus, the player sends a network request carrying the offset and the size of the target interval to the server so as to request the media data of the target interval, and the server extracts the media data in the media file based on the offset and the size of the target interval and returns the media data of the target interval at one time without secondary acquisition. The request times of the player can be reduced, and the processing efficiency is improved accordingly.

Step 204, the acquired part of media data and moov/metadata describing the part of media data are packaged according to the box structure of the fragmented media file to obtain a corresponding fragmented media file.

Figure 8:
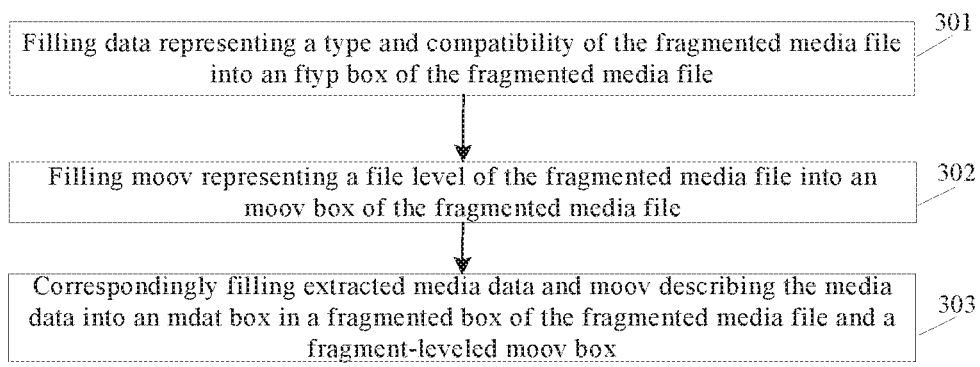
FIG. 8 is an optional schematic flowchart of encapsulating a fragmented media file provided by an embodiment of the disclosure.

In one embodiment of the disclosure, reference is made to FIG. 8, which is an alternative flow diagram of a packaged fragmented media file provided by an example of the disclosure, and the illustration will be described in conjunction with the steps shown in FIG. 8.

Step 301, the ftyp box of the fragmented media file is filled with data representing the type and compatibility of the fragmented media file.

For example, taking the FMP4 file of an encapsulation structure formed by encapsulation shown in FIG. 4 as an example, the type and size/length of the box (representing the overall length of the ftyp box) are filled in the ftyp box of the FMP4 file, i.e., the header of the ftyp box, and data (binary data) representing the file type as FMP4 and a compatible protocol are generated by filling in the data portion of the ftyp box.

At step 302, metadata representing the file level of the fragmented media file are filled into the moov box of the fragmented media file.

In one embodiment, the metadata describing the media data required to fill the nested structure are calculated according to the media data to be filled into the encapsulation structure of the fragmented media file and according to the nested structure of the moov box in the fragmented media file.

Still taking FIG. 4 as an example, the metadata representing the file level of the FMP4 file are calculated and filled into a metadata box (i.e., moov box) of the FMP4; three boxes of mvhd, track, and movie extend (mvex) are nested in the moov box.

The moov encapsulated in the mvhd box is used for representing media information related to the playing of the fragmented media file, and the media information includes the position, time, creation time, modification time and the like; the sub-box nested in the track box represents reference and description of the corresponding track in the media data. For example, a box (denoted as a tkhd box) describing characteristics and general information (such as duration and size) of a track and a box (denoted as an mdia box) recording media information (such as media type and sampled information) of a track are nested in the track box.

Step 303, the extracted media data and metadata describing the media data are correspondingly filled into the mdat box in the fragment box of the fragmented media file and the moov box at the fragment level.

In one embodiment, one or more fragments may be packaged in the fragmented media file and, for media data to be filled, which may be filled into one or more fragmented media data boxes (i.e., mdat boxes) of the fragmented media file; each fragment encapsulates a fragment-leveled moov box (noted as an moof box), and the metadata filled therein are used to describe the media data filled in the fragment. The fragments are enabled to be decoded independently.

In combination with FIG. 4, as an example, the media data to be filled are filled into two fragments of the encapsulation structure of the FMP4 file, and the media data are filled into each section; the metadata need to be filled into the fragment-leveled moov box (i.e., the moof box) of the corresponding fragment are calculated and correspondingly filled into the sub-box nested in the moof box; the header of the moof box is called the moof box, and the binary data filled therein are used for indicating the type of the box as "moof box" and the length of the moof box.

In one embodiment of filling data into corresponding boxes in steps 301 to 303, when a filling operation is performed, a writing operation function of a class is invoked to complete writing and merging binary data in a memory buffer of the sub-box, and an instance of the class is returned; the returned instance is configured for merging the sub-box with a sub-box having a nested relationship.

As an example of the filled data, a static method includes establishing a class MP4 for realizing the packaging function, and encapsulating each sub-box in a fragmented media file to be a class Stream; establishing a class Stream configured for realizing a binary data operation function. Each class Stream is provided with a memory buffer area for storing binary data to be filled; multi-byte decimal data to be filled are converted to be binary data through the static method provided by Stream; binary data to be filled into the sub-box are combined and filled in the memory buffer area through the writing operation function provided by the instance of class Stream; the static method provided by Stream returns a new Stream instance to merge the current sub-box with another sub-box having a nested relationship.

Step 205, the fragmented media file is sent to the media element of the webpage for decoding and playing through the media source expansion interface of the webpage.

In one embodiment, the player sending the fragmented media file to the media element of the webpage for playing through the media source expansion interface of the webpage can include the steps that: the player adds the fragmented media file to a media source object in the MSE interface; the MSE is called to create a virtual address corresponding to the media source object; the virtual address is delivered to the media element of the webpage, and the virtual address is used for providing the media element to play the media source object as a data source. The media element can be a video element and/or an audio element of a webpage, and the media element is played by acquiring a media source object through a virtual address.

Figure 9:
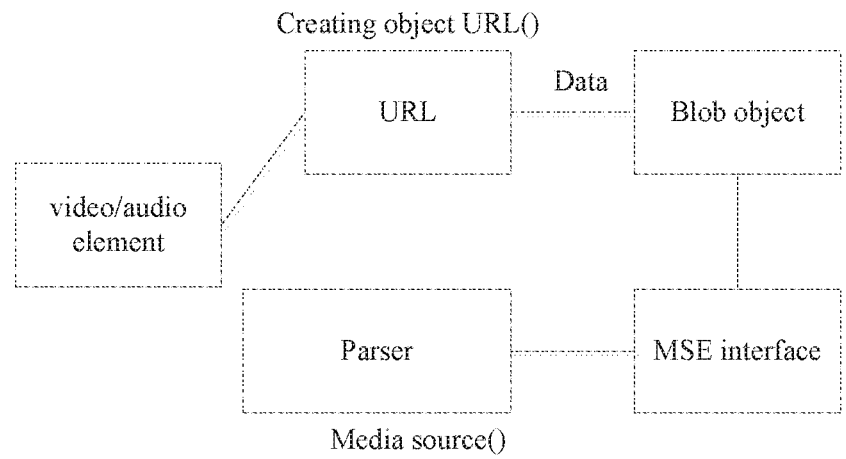
FIG. 9 is a schematic view of playing a fragmented media file over a media source extension interface of a webpage by a player provided by an embodiment of the disclosure.

With reference to FIG. 9, FIG. 9 is an optional schematic diagram of a player playing a fragmented media file through a media source expansion interface of a webpage provided by the embodiment of the disclosure. When the player receives a playing event of the media file in a playing window (the player corresponding to the playing window) in the webpage, the player creates a media source object by executing a MediaSource method through MSE; an addSourceBuffer method packaged in the media source expansion interface is exerted to create a cache of the MediaSource object, namely the SourceBuffer object; one MediaSource object has one or more SourceBuffer objects, and each SourceBuffer object can be used for corresponding to one playing window in the webpage, for receiving a fragmented media file to be played in the window.

In the playing process of the media file, a Parser in the player continuously constructs a new fragmented media file by parsing newly acquired media data, and adds the fragmented media file to a SourceBuffer object of the same MediaSource object by executing an appendBuffer method of the SourceBuffer object.

After the player adds the constructed fragmented media file to the media source object in the media resource expansion interface, the media resource expansion interface is called to create a virtual address corresponding to the media source object. For example, the player executes the createObjectURL method packaged in the media source extension interface to create a virtual address corresponding to the media source object, i.e., a virtual Uniform Resource Locator (URL), in which a fragmented media file of the Blob type is packaged.

In addition, the player sets the MediaSource object to be the source (src) attribute of the virtual URL, which binds the virtual URL to a media element in the webpage, such as a video/audio element, and the process is also referred to as associating the media source object to the media element in the webpage.

In the embodiment of the disclosure, the fragmented media file added to the media source object is also the currently played fragmented media file. For example, the fragmented media file 1 is currently played. After subsequent fragmented media files 2, 3 have been constructed, the constructed fragmented media files 2, 3 will be added to the Source Buffer of the MSE for preloading, and accordingly, the first key frame of the two key frames corresponding to the media data acquired by the player is the first key frame occurring after the fragmented media file 1. Regarding the player transmitting the virtual address to the media element of the webpage, the player contains a statement for calling the media element to play the virtual URL, i.e. <audio> virtual URL. When the webpage interprets the corresponding statement in the player embedded in the webpage, the media element of the webpage is enabled to read the fragmented media file from the SourceBuffer object bound by the virtual URL, and the fragmented media file is decoded and played.

Next, the process of converting the MP4 file into the FMP4 file by the player and playing the FMP4 file on the webpage through the media source expansion interface will be described.

Figure 10:
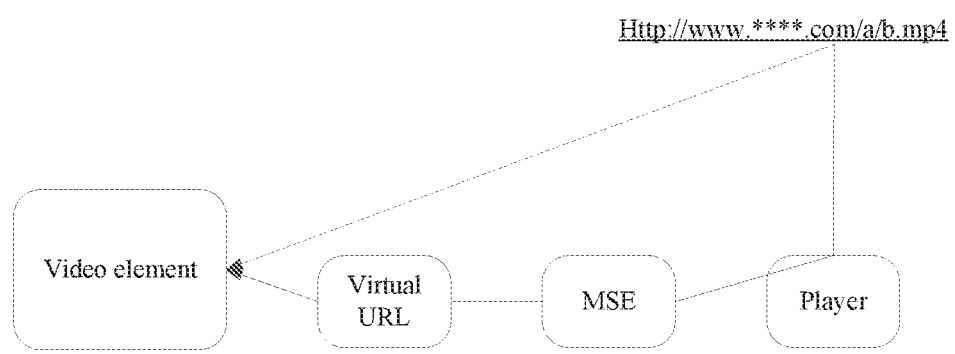
FIG. 10 is a second schematic flowchart of a playing method of a webpage-based media file provided by an embodiment of the disclosure.

With reference to FIG. 10, FIG. 10 is a schematic diagram of converting an MP4 file into an FMP4 file and playing the FMP4 file through a media source expansion interface provided by the embodiment of the disclosure; a player requests to obtain part of the media data in the MP4 file from the server based on a real address of the media file (http://www.touitao.com/a/b.mp4), e.g. data whose decoding time is within a given time period for subsequent playing points.

The player constructs the FMP4 file based on the acquired media data, and then adds the FMP4 file to the SourceBuffer object corresponding to the MediaSource object. As the virtual URL is bound to the MediaSource object, when the code of the player invoking the audio/video element is executed, the audio/video element reads the continuously added new FMP4 file from the SourceBuffer object of the MediaSource object and decodes the new FMP4 file to realize continuously playing the media file. The media element of the webpage acquires the media source object on the basis of the virtual URL so as to play the media file instead of acquiring the media data on the basis of the real address of the media file, thereby realizing the protection of the real address of the media file.

Figure 11:
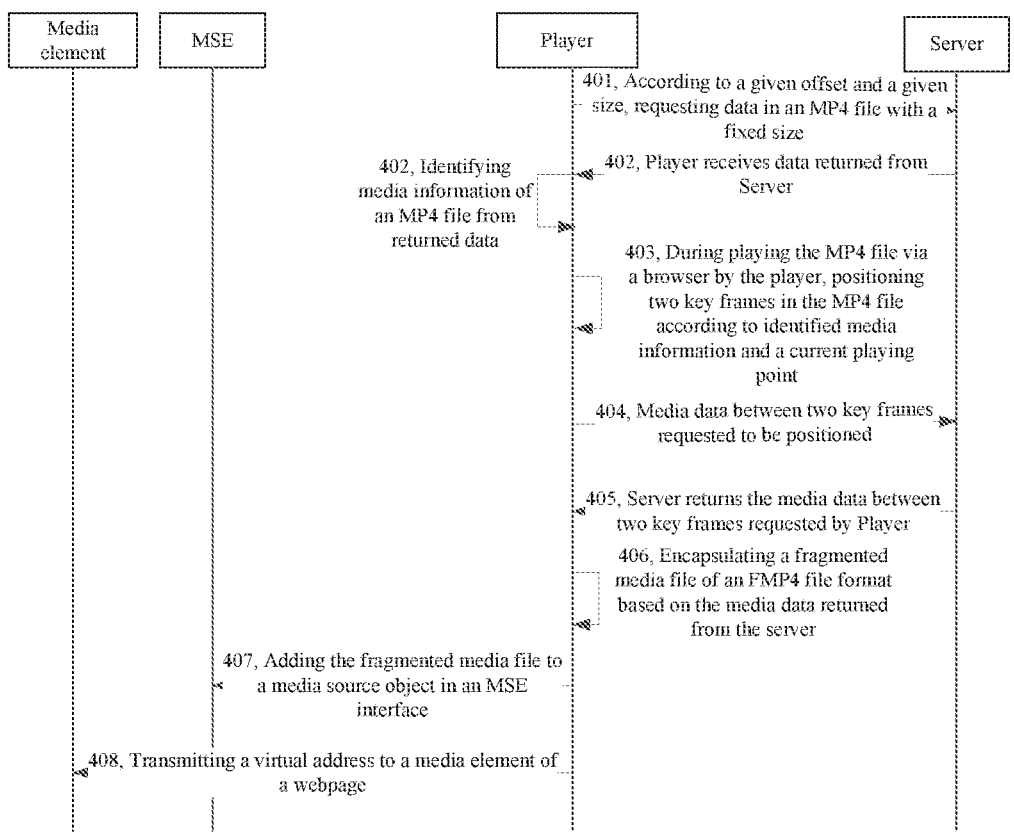
FIG. 11 is a third schematic view of a playing method of a webpage-based media file provided by an embodiment of the disclosure.
Figure 12:
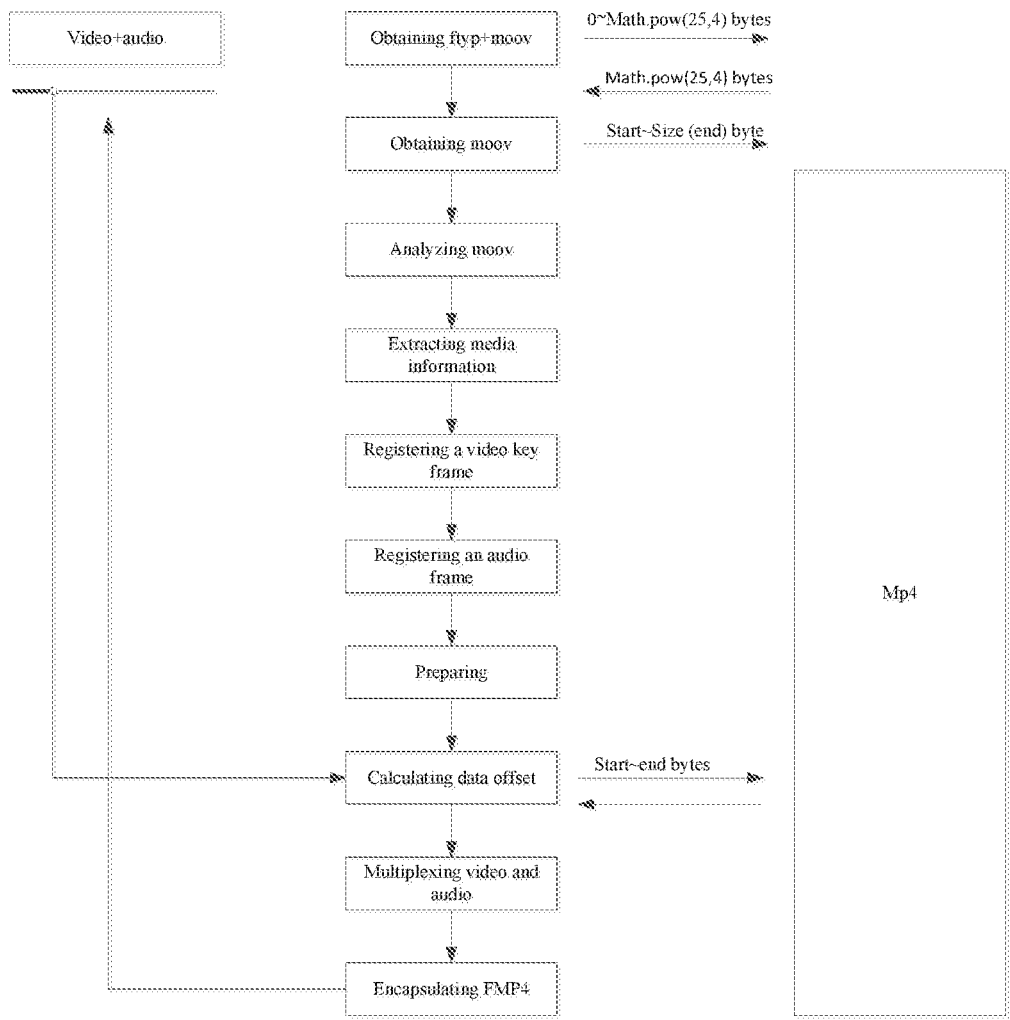
FIG. 12 is a fourth schematic flowchart of a playing method of a webpage-based media file provided by an embodiment of the disclosure.

Next, taking the situation that the player is embedded in the webpage of the browser and the player plays the MP4 file using the HTML5 media elements (video element and audio element) of the browser as an example, the playing method of the webpage-based media file of the disclosed embodiment is explained. FIG. 1 illustrates an alternative flow diagram of a playing method of a webpage-based media file provided by an embodiment of the disclosure, and FIG. 12 illustrates another alternative flow diagram of a playing method of a webpage-based media file provided by an embodiment of the disclosure. In combination of FIG. 11 and FIG. 12, the playing method of the webpage-based media file provided by the embodiment of the disclosure includes the following steps.

Step 401, the player requests the data in the MP4 file with a fixed size from the server according to the set offset and size.

The player sends a data request carrying the set offset and size to the server to obtain binary data starting from zero byte in the MP4 file which subject to the set size. Taking the encapsulation structure of the MP4 file including sequentially packaged ftyp box, moov box and mdat box as an example, the set size can be obtained according to statistics of sizes of the ftyp box and the moov box of the existing MP4 file, so that the set size can cover the sum of the ftyp box and the moov box of a set proportion (e.g., all) of the MP4 file, thereby ensuring that complete moov box binary data can be requested from the server at one time. With reference to FIG. 12, the player requests binary data with a set offset of 0 byte and a set size of Math.pow (25, 4) bytes, acquires moov data from the binary data returned by the server, recalculates the offset (start in FIG. 12) and the size (start-size) if the complete moov data are not acquired after one request, and then requests for the second time.

Step 402, the player receives the data returned by the server and identifies the media information of the MP4 file from the data returned by the server.

The media information of the MP4 file includes information such as offset, size, decoding time of video/audio frames in the MP4 file.

In one embodiment, the player can identify, the media information of the MP4 file by: identifying binary data of the fytp box from the data returned by the server, and reading the type and the size of the box from the remaining binary data; when the type of the box is read to be an moov box, and the size of the remaining binary data is not less than the size of the moov box, parsing the media information from the remaining binary data. Here, for the binary data returned by the server, the initial section of binary data must correspond to the ftyp box, and according to the encapsulation standard of the ftyp box, the size (i.e. length) of the ftyp box and the size of the complete MP4 file can be read. For example, the size of the ftyp box is a (in bytes), and the header information of the subsequent box is read from a+1 to achieve the type and size of the box. Regarding the moov box, if the set size, namely the size of the ftyp box, is larger than the size of the moov box, it is indicated that the complete binary data of the moov box have been retrieved, and the binary data can be parsed according to the encapsulation structure, and the media information can be restored.

In one embodiment, when the binary data returned by the server fail to contain complete moov data, the size of the box is read from the acquired binary data, and the offset and the size of the moov box in the MP4 file are determined. According to the determined offset and size, when the type of the box read from the remaining binary data is an moov box and the size of the remaining binary data is not smaller than the size of the moov box, the moov data in the MP4 file which start with the offset of the moov box in the MP4 file and conform to the size of the moov box in the MP4 file can be obtained from the server; when the type of the box read from the remaining binary data is an moov box, and the size of the remaining binary data is smaller than the size of the moov box, the difference between the size of the moov box and the size of the remaining binary data is calculated as the new size of the secondary request, and the binary data will be requested from the server for the second time with the sum of the offset and the size requested for the first time as the new offset.

In practical application, the encapsulation structure of the MP4 file can be sequentially packaged fytp box, mdat box, and moov box. When the type of the box read from the remaining binary data is the mdat box, the sum of the size of the mdat box and the size of the moov box is calculated as the new offset of the secondary request, and the binary data will be requested from the server for the second time with the set/predetermined size.

Step 403, in the process that the player plays the MP4 file through the browser, two key frames in the MP4 file are positioned according to the identified media information and the current playing point.

In the embodiment of the disclosure, the player plays the media data (at least containing video data and further containing audio data) between the two key frames as a loading unit, i.e. the player plays the MP4 file by loading the media data between the two key frames, and it can be a common frame existing between the two key frames, i.e. the two key frames are adjacent key frames, and it further can be other key frames existing between the two key frames.

Taking the playing point of the MP4 file reached by means of jumping as an example, with reference to FIG. 12, the player first determines the key frames, namely registering video key frames, and the player locates the first key frame as the first key frame with the decoding time before the playing point in the MP4 file, and the second frame is positioned as the key frame in the MP4 file with the decoding time later than the first key frame. Here, the video frame of the media file corresponding to the playing point includes both the normal frame and the key frame. When the video frame corresponding to the playing point is just the key frame, the first key frame in the MP4 file of which the decoding time precedes the playing point is the key frame corresponding to the playing point; that is, the first key frame in the media data requested by the player is the key frame corresponding to the playing point.

Positioning the two key frames in the MP4 file by the player includes: determining the offset and size of the first key frame and those of the second key frame on the basis of the identified media information and the current playing point (corresponding to calculation of the data offset in FIG. 12), and then requesting the media data between the first key frame and the second key frame from the server on the basis of the offsets and sizes.

Step 404, media data between the located two key frames are requested from the server.

In actual implementation, the player sends a network request to the server to request media data between two key frames located in the MP4 file; the network request carries offset and size of a target interval corresponding to the two key frames.

Here, the player locates the video frame in mdat through the offset and size of the video frame between the first key frame and the second key frame in the MP4 file, and locates the audio frame in mdat (corresponding to registering the audio frame in FIG. 12) through the offset and size of the audio frame aligned with the video frame in the MP4 file, taking an interval formed by an upper limit and a lower limit of the positions as a target interval (corresponding to multiplexing video and audio in FIG. 12); the offset and size corresponding to the upper limit of the positions are the offset and size corresponding to the upper limit of the target interval, and the offset and size corresponding to the lower limit of the positions are the offset and size corresponding to the lower limit of the target interval.

Step 405, the server returns media data between the two key frames requested by the player.

Step 406, the fragmented media file in the FMP4 format is packaged based on the media data returned by the server.

In actual implementation, the server calculates the metadata of the fragmented media file level according to the media information of the media data, and then fills the metadata of the fragmented media file level and the media data according to the packaging format of the fragmented media file in the FMP4 format to obtain the fragmented media file in the FMP4 format.

Step 407, a fragmented media file is added to a media source object in the MSE interface.

Step 408, a virtual address is delivered to the media element of the webpage.

The virtual address is used for playing the media elements (the Video element and the Audio element) by taking the media source object as a data source.

By applying the embodiment disclosed by the disclosure, the following beneficial effects can be achieved.

1. When a given time period of the media file needs to be played, only the media data within a given time need to be extracted from the media file in the non-streaming media format, and the media data are packaged to be the independently decodable fragmented media file. On the one hand, it overcomes the limitation that non-streaming format files only can be played independently after full download, and the live playing is superior; on the other hand, since only the fragmented media file needs to be constructed for a given time period, rather than converting the complete media file into the streaming media format in advance, the conversion delay is slight, so that the pre-storage is not in need; no additional storage space is required more than the original media file, and the occupation of the storage space is remarkably reduced.

2. The player converts the media data in the media file in the non-streaming media format into fragment media files, and sends the fragment media files to the media elements of the webpage through the media source expansion interface of the webpage for decoding and playing, so that the player plays the media file in the non-streaming media format through being embedded in the webpage, and the limitation that the non-streaming media format files can be independently played only after the non-streaming media format files are completely downloaded when the non-streaming media format files are played through the client (webpage) is overcome.

3. The player acquires part of the media data between the key frames of the media files, which can result in controlling the loading of the media data in the process of playing the media files.

4. The packaged fragmented media file is based on part of the media data of the acquired media file instead of all the data of the media file, so that the conversion delay is slight; pre-storage is not needed; no additional storage space is required other than the original media file; the occupation of the storage space is remarkably reduced; neither black screen nor pause will appear when the resolution is switched in the viewing process of a user, and the real-time performance (luring switching resolution is improved.

5. The media element of the webpage acquires the fragmented media file for decoding and playing on the basis of the virtual address instead of acquiring and playing the media data on the basis of the real address of the media file, so that the real address of the MP4 file is protected.

Figure 13:
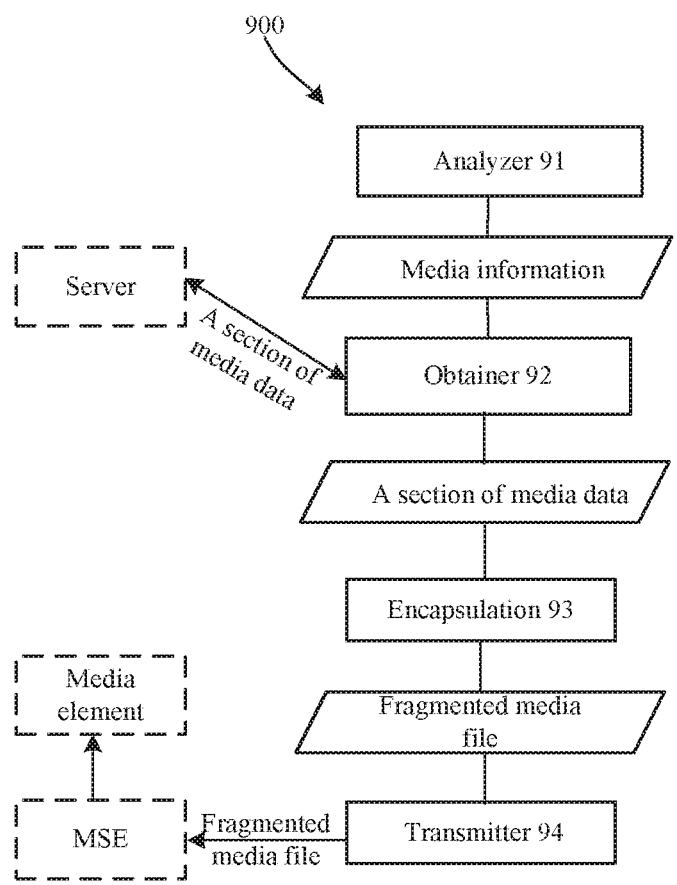
FIG. 13 is a second structural schematic view of a playing device of a webpage-based media file provided by an embodiment of the disclosure.

The playing device of a webpage-based media file will be illustrated; as an example of a hardware implementation or a software implementation of the playing device of a webpage-based media file, the playing device of a webpage-based media file may be provided as a series of modules having a coupling relationship at the signal/information/data plane. The illustration will be associated with FIG. 13. Referring to FIG. 13, FIG. 13 is an optional component diagram of the playing device of a webpage-based media file according to an embodiment of the disclosure, which shows a series of units/components included in the playing device for implementing the webpage-based media file but the unit structure of the playing device of the webpage-based media file is not limited to that shown in FIG. 13. For example, the units therein may be further divided or combined according to different functions implemented. With reference to FIG. 13, the playing device of a webpage-based media file 900 includes an analyzer 91 disposed to analyze moov encapsulated in an moov box of a media file to obtain media information configured for describing media data encapsulated in an mdat box of the media file by a player built-in a webpage, an obtainer 92 disposed to obtain a section of media data in the mdat box of the media file according to time and a position of the media data represented by the media information, an encapsulation 93 disposed to encapsulate the obtained section of media data and moov describing the section of media data according to a box structure of a fragmented media file to obtain a corresponding fragmented media file, and a sender 94 disposed to send the fragmented media file to a media element of the webpage by a media source extension interface of the webpage for decoding and playing.

The media file adopts a non-streaming media format.

In an embodiment, the obtainer is further disposed to obtain binary data starting from a zero byte and subject to a given size in the media file.

Binary data of an ftyp box are determined from the obtained binary data, and a type and a size of a box are read from the rest binary data.

When a type of a box is read to be an moov box and a size of the rest binary data is no less than a size of the moov box, the media information will be obtained from the rest binary data by analysis.

In one embodiment, the obtainer is further disposed to read the size of the box from the obtained binary data to determine an offset and a size of the moov box in the media file when the obtained binary data do not include intact moov.

According to the offset and the size of the moov box, the moov starting from the offset and subjecting to the size in the media file is obtained.

In one embodiment, the box encapsulation structure adopted by the media file includes sequentially encapsulated ftyp box, moov box and mdat box.

In one embodiment, the analyzer is further disposed to analyze a nested structure of sub-boxes in the moov box and read binary data in each of the sub-boxes according to the nested structure.

Media information of the media data represented by each of the sub-boxes is obtained from the read binary data by analysis.

In one embodiment, the obtainer is further disposed to read a position and time of the media data from the media information; the media data include video frames and audio frames.

Two key frames whose time span contains a given period from the time of the media data and audio frames aligned with the given period are searched.

A position of the video frames between the two key frames and a position of the aligned audio frames in the media file are searched from the position of the media data.

Media data in a corresponding position in an mdat box of the media file are obtained.

In one embodiment, the obtainer is further disposed to search a first key frame whose decoding time is aligned with starting time of the given period from the time of the media data, or search a first key frame closest to the starting time from key frames whose decoding time is earlier than the starting time of the given period.

A second key frame whose decoding time is aligned with ending time of the given period is searched from the time of the media data; or a second key frame closest to the ending time is searched from key frames whose decoding time is later than the ending time of the given period.

In one embodiment, the obtainer is further disposed to search audio frames whose decoding time is distributed according to the given period from the time of the media data.

Decoding time of a first audio frame is aligned with the starting time of the given period, or both earlier than the starting time of the given period and closest to the starting time.

Decoding time of the last audio frame is aligned with the ending time of the given period, or both later than the ending time of the given period and closest to the ending time.

In one embodiment, the obtainer is further disposed to determine a range formed by a minimal offset and a maximal size according to an offset and a size corresponding to a position of the video frames between the two key frames and an offset and a size corresponding to a position of the aligned audio frames.

Media data in a corresponding range of the mdat box of the media file are obtained.

In one embodiment, the offset indicates a storing starting position of the media data in the mdat box, and the size indicates an occupation length of the media data starting from the storing starting position.

In one embodiment, the encapsulation is further disposed to fill data representing a type and compatibility of the fragmented media file in an ftyp box of the fragmented media file.

The moov representing a file level of the fragmented media file is filled in an moov box of the fragmented media file.

The extracted media data and the moov describing the media data are correspondingly filled into the mdat box and a fragment-leveled moov box in a fragmented box of the fragmented media file.

In one embodiment, the sender is further disposed to add the fragmented media file to a media source object in a media source extension interface.

A virtual website corresponding to the media source object is created by invoking the media source extension interface.

The virtual website is transmitted to a media element of the webpage; the virtual website is configured for providing the media element to play by taking the media source object as a data source.

The embodiment of the disclosure further provides a readable storage medium. The readable storage medium can include various media on which program code may be stored, such as a mobile storage device, random access memory (RAM), read-only memory (ROM), magnetic or optical disks, and the like. The readable storage medium stores an executable instruction.

The executable instruction is configured for realizing the playing method of the webpage-based media file when being executed by the processor.

The aforementioned contents merely are concrete embodiments of the disclosure, but the protective scope of the disclosure is not restricted thereto. Any modification or substitution within the technical scope disclosed by the disclosure that can easily be associated by a person skilled in the art should be included in the protective scope of the disclosure. Therefore, the protective scope of the disclosure should refer to those of the claims.

What is claimed is:

1. A playing method of a webpage-based media file, comprising:
    analyzing moov encapsulated in an moov box of a media file to obtain media information configured for describing media data encapsulated in an mdat box of the media file by a player built-in a webpage; wherein the media file adopts a non-streaming media format;
    according to time and a position of the media data represented by the media information, obtaining a section of media data in the mdat box of the media file;
    encapsulating the obtained section of media data and moov describing the section of media data according to a box structure of a fragmented media file to obtain a corresponding fragmented media file;
    sending the fragmented media file to a media element of the webpage by a media source extension interface of the webpage for decoding and playing;
    wherein the playing method further comprises:
    obtaining binary data starting from a zero byte and subjecting to a given size in the media file;
    identifying binary data of an ftyp box from the obtained binary data, and reading a type and a size of a box from the rest binary data; and
    when the type of the box is read to be an moov box and a size of the rest binary data is not less than a size of the moov box, obtaining the media information from the rest binary data by analysis.

2. The playing method according to claim 1, wherein the playing method further comprises:
    when the obtained binary data do not comprise intact moov, reading the size of the box from the obtained binary data to determine an offset and a size of the moov box in the media file; and
    according to the offset and the size of the moov box, obtaining moov starting from the offset and subjecting to the size in the media file.

3. The playing method according to claim 1, wherein a box encapsulation structure adopted by the media file comprises: sequentially encapsulated ftyp box, moov box and mdat box.

4. The playing method according to claim 1, wherein the analyzing moov encapsulated in an moov box of a media file to obtain media information configured for describing media data encapsulated in an mdat box of the media file comprises:
    analyzing a nested structure of sub-boxes in the moov box, reading binary data in each of the sub-boxes according to the nested structure; and
    obtaining media information of the media data represented by each of the sub-boxes from the read binary data by analysis.

5. The playing method according to claim 1, wherein the according to time and a position of the media data represented by the media information, obtaining a section of media data in the mdat box of the media file comprises:
    reading the position and the time of the media data from the media information; wherein the media data comprise video frames and audio frames;
    searching two key frames whose time span comprises a given period from the time of the media data, and searching audio frames aligned with video frames between the two key frames;
    searching a position of the video frames between the two key frames and a position of the aligned audio frames in the media file from the position of the media data; and
    obtaining media data in a corresponding position in the mdat box of the media file.

6. The playing method according to claim 5, wherein the searching two key frames whose time span comprises a given period from the time of the media data comprises:
    searching a first key frame whose decoding time is aligned with starting time of the given period from the time of the media data, or searching a first key frame whose decoding time is closest to starting time of the given period from key frames whose decoding time is earlier than the starting time of the given period; and searching a second key frame whose decoding time is aligned with ending time of the given period from the time of the media data, or searching a second key frame whose decoding time is closest to ending time from key frames whose decoding time is later than the ending time of the given period.

7. The playing method according to claim 5, wherein the searching audio frames aligned with video frames between the two key frames from the time of the media data comprises:

searching the audio frames whose decoding time is distributed according to the given period from the time of the media data;

wherein decoding time of a first audio frame is aligned with starting time of the given period, or both earlier than the starting time of the given period and closest to the starting time;

wherein decoding time of a last audio frame is aligned with ending time of the given period, or both later than the ending time of the given period and closest to the ending time.

8. The playing method according to claim 5, wherein the obtaining media data in a corresponding position in the mdat box of the media file comprises:

according to an offset and a size corresponding to the position of the video frames between the two key frames and an offset and a size corresponding to the position of the aligned audio frames determining a range formed by a minimal offset and a maximal size; and obtaining media data in a corresponding range of the mdat box of the media file.

9. The playing method according to claim 8, wherein the offset indicates a storing starting position of the media data in the mdat box, and the size indicates an occupation length of the media data starting from the storing starting position.

10. The playing method according to claim 1, wherein the encapsulating the obtained section of media data and moov describing the section of media data according to a box structure of a fragmented media file to obtain a corresponding fragmented media file comprises:

filling data representing a type and compatibility of the fragmented media file into an ftyp box of the fragmented media file;

filling moov representing a file level of the fragmented media file into an moov box of the fragmented media file; and correspondingly filling extracted media data and moov describing the media data into an mdat box and a fragment-leveled moov box in a fragmented box of the fragmented media file.

11. The playing method according to claim 1, wherein the sending the fragmented media file to a media element of the webpage by a media source extension interface of the webpage for decoding and playing comprises:

adding the fragmented media file to a media source object in the media source extension interface;

creating a virtual website corresponding to the media source object by invoking the media source extension interface; and transmitting the virtual website to a media element of the webpage; wherein the virtual website is configured for providing the media element to play by taking the media source object as a data source.

12. A playing device of a webpage-based media file, comprising:

at least one processor; and at least one memory communicatively coupled to the at least one processor and storing instructions that upon execution by the at least one processor cause the playing device to:

analyze moov encapsulated in an moov box of a media file to obtain media information configured for describing media data encapsulated in an mdat box of the media file by a player built-in a webpage; wherein the media file adopts a non-streaming media format;

obtain a section of media data in the mdat box of the media file according to time and a position of the media data represented by the media information;

encapsulate the obtained section of media data and moov describing the section of media data according to a box structure of a fragmented media file to obtain a corresponding fragmented media file;

send the fragmented media file to a media element of the webpage by a media source extension interface of the webpage fix decoding and playing;

wherein the at least one memory further stores instructions that upon execution by the at least one processor cause the playing device to:

obtain binary data starting from a zero byte and subjecting to a given size in the media file;

identify binary data of an ftyp box from the obtained binary data, and read a type and a size of a box from the rest binary data; and when the type of the box is read to be an moov box and a size of the rest binary data is not less than a size of the moov box, obtain the media information from the rest binary data by analysis.

13. The playing device according to claim 12, wherein the at least one memory further stores instructions that upon execution by the at least one processor cause the playing device to:

read the size of the box from the obtained binary data to determine an offset and a size of the moov box in the media file when the obtained binary data do not comprise intact moov;

according to the offset and the size of the moov box, obtain moov starting from the offset and subjecting to the size in the media file.

14. The playing device according to claim 12, wherein a box encapsulation structure adopted by the media file comprises: sequentially encapsulated ftyp box, moov box and mdat box.

15. The playing device according to claim 12, wherein the at least one memory further stores instructions that upon execution by the at least one processor cause the playing device to:

analyze a nested structure of sub-boxes in the moov box and read binary data in each of the sub-boxes according to the nested structure;

obtain media information of the media data represented by each of the sub-boxes from the read binary data by analysis.

16. The playing device according to claim 12, wherein the at least one memory further stores instructions that upon execution by the at least one processor cause the playing device to:

read the position and the time of the media data from the media information; wherein the media data comprise video frames and audio frames;

search two key frames whose time span comprises a given period from the time of the media data, and search audio frames aligned with the given period;

search a position of the video frames between the two key frames and a position of the aligned audio frames in the media file from the position of the media data; and obtain media data in a corresponding position in the mdat box of the media file.

17. The playing device according to claim 16, wherein the at least one memory further stores instructions that upon execution by the at least one processor cause the playing device to:

search a first key frame whose decoding time is aligned with starting time of the given period from the time of the media data, or search a first key frame closest to the starting time from key frames whose decoding time is earlier than the starting time of the given period;

search a second key frame whose decoding time 1 s aligned with ending time of the given period from the time of the media data, or search a second key frame closest to the ending time from key frames whose decoding time is later than the ending time of the given period.

18. A non-transitory storage medium, storing an executable instruction, disposed to perform operations when the executable instruction is executed by a computing device, the operations comprising:

analyzing moov encapsulated in an moov box of a media file to obtain media information configured for describing media data encapsulated in an mdat box of the media file by a player built-in a webpage; wherein the media file adopts a non-streaming media format;

according to time and a position of the media data represented by the media information, obtaining a section of media data in the mdat box of the media file;

encapsulating the obtained section of media data and moov describing the section of media data according to a box structure of a fragmented media file to obtain a corresponding fragmented media file;

sending the fragmented media file to a media element of the webpage by a media source extension interface of the webpage for decoding and playing;

wherein the operations further comprise:

obtaining binary data starting from a zero byte and subjecting to a given size in the media file;

identifying binary data of an ftyp box from the obtained binary data, and reading a type and a size of a box from the rest binary data; and when the type of the box is read to be an moov box and a size of the rest binary data is not less than a size of the moov box, obtaining the media information from the rest binary data by analysis.

* * * * *